(12) United States Patent
Rohden et al.

(10) Patent No.: US 9,683,537 B2
(45) Date of Patent: Jun. 20, 2017

(54) TURBINE FOR A HYDROELECTRIC POWER PLANT AND HYDROELECTRIC POWER PLANT

(75) Inventors: Rolf Rohden, Aurich (DE); Jan Niko Hauser, Aurich (DE); Walter Lambertz, Aurich (DE)

(73) Assignee: Wobben Properties GmbH, Aurich (DE)

( * ) Notice: Subject to any disclaimer, the term of this patent is extended or adjusted under 35 U.S.C. 154(b) by 419 days.

(21) Appl. No.: 14/356,338

(22) PCT Filed: Aug. 31, 2012

(86) PCT No.: PCT/EP2012/066995
§ 371 (c)(1),
(2), (4) Date: Aug. 13, 2014

(87) PCT Pub. No.: WO2013/068144
PCT Pub. Date: May 16, 2013

(65) Prior Publication Data
US 2014/0369837 A1    Dec. 18, 2014

(30) Foreign Application Priority Data

Nov. 8, 2011    (DE) .......................... 10 2011 085 950

(51) Int. Cl.
*F03B 3/14*    (2006.01)
*F03B 3/06*    (2006.01)

(52) U.S. Cl.
CPC ................ *F03B 3/145* (2013.01); *F03B 3/06* (2013.01); *Y02E 10/223* (2013.01)

(58) Field of Classification Search
CPC .................................. F03B 3/06; F03B 3/145
See application file for complete search history.

(56) References Cited

U.S. PATENT DOCUMENTS

| 1,907,466 | A | 5/1933 | Terry |
| 3,229,771 | A | 1/1966 | Hedberg |

(Continued)

FOREIGN PATENT DOCUMENTS

| CA | 1 158 526 A | 12/1983 |
| DE | 666 385 C | 10/1938 |

(Continued)

*Primary Examiner* — Woody Lee, Jr.
(74) *Attorney, Agent, or Firm* — Seed IP Law Group LLP

(57) ABSTRACT

There is provided a turbine for a hydroelectric power plant comprising a hub, a plurality of turbine blades provided on the hub, a pitch angle adjusting unit coupled to the turbine blades for adjusting the pitch angle of the turbine blades, a double-acting hydraulic cylinder and a piston rod connected thereto. The piston rod is coupled to the pitch angle adjusting unit in such a way that the pitch angle adjusting unit performs a rotational movement when the piston rod is moved in the longitudinal direction. The double-acting hydraulic cylinder is provided in a hydraulic chamber coupled by way of a first and a second hydraulic line so that the double-acting hydraulic cylinder is displaceable by feed of a hydraulic fluid through the first or second hydraulic line and thus leads to adjustment of the pitch angle of the turbine blades by way of the coupling to the piston rod and the pitch angle adjusting unit.

6 Claims, 11 Drawing Sheets

(56) References Cited

U.S. PATENT DOCUMENTS

| | | | | |
|---|---|---|---|---|
| 3,447,783 A | * | 6/1969 | Wijkander | F03B 15/06 |
| | | | | 415/129 |
| 3,785,747 A | | 1/1974 | Mayo, Jr. | |
| 4,474,533 A | | 10/1984 | Hino | |
| 4,475,865 A | * | 10/1984 | Sugishita | F03B 15/04 |
| | | | | 415/36 |
| 5,209,632 A | * | 5/1993 | Ito | F03B 3/145 |
| | | | | 415/129 |
| 8,192,164 B2 | * | 6/2012 | Herrmann | F03B 3/06 |
| | | | | 416/157 R |
| 8,294,291 B2 | | 10/2012 | Rohden et al. | |
| 2007/0140829 A1 | * | 6/2007 | Maillard De La Morandais | F03B 3/06 |
| | | | | 415/4.1 |
| 2009/0214343 A1 | | 8/2009 | Rohden et al. | |
| 2010/0232964 A1 | | 9/2010 | Geiger | |
| 2011/0293416 A1 | | 12/2011 | Rohden | |

FOREIGN PATENT DOCUMENTS

| | | |
|---|---|---|
| DE | 833 630 | 3/1952 |
| DE | 1 503 244 A1 | 9/1969 |
| DE | 103 36 528 A1 | 3/2005 |
| FR | 1.014.451 A | 8/1952 |
| FR | 2 487 437 A1 | 1/1982 |
| GB | 1028519 | 5/1966 |
| JP | 60-90987 A | 5/1985 |
| JP | 63-183480 U | 11/1988 |
| JP | 11-159434 A | 6/1999 |
| JP | 2011-503420 A | 7/2011 |
| KR | 10-2008-0025753 A | 3/2008 |
| SU | 1004666 A1 | 3/1983 |
| WO | 2010/026072 A2 | 3/2010 |

\* cited by examiner

TURBINE FOR A HYDROELECTRIC POWER PLANT AND HYDROELECTRIC POWER PLANT

BACKGROUND

Technical Field

The present invention concerns a turbine for a hydroelectric power plant and a hydroelectric power plant.

Description of the Related Art

WO 2010/026072 A2 discloses a hydroelectric power plant with a flow passage and a turbine in the flow passage, the turbine being connected to a generator by way of a shaft. The flow passage has a first portion with a first narrowing and a second portion of a diameter smaller than that of the enlargement, wherein the turbine is provided in the second portion.

U.S. 2009/0214343 A1 discloses a turbine for a hydroelectric power plant. The turbine has a rotor having a plurality of turbine blades and a guide apparatus which is arranged downstream of the rotor and which functions as a support apparatus. The turbine has a substantially spherical hub and the pitch angle of the turbine blades is adapted to be adjustable.

BRIEF SUMMARY

One or more embodiments of the present invention is to provide a hydroelectric power plant which is improved over the state of the art.

In one embodiment there is provided a turbine for a hydroelectric power plant comprising a hub, a plurality of turbine blades provided on the hub, a pitch angle adjusting unit coupled to the turbine blades for adjusting the pitch angle of the turbine blades, a double-acting hydraulic cylinder and a piston rod connected thereto. The piston rod is coupled to the pitch angle adjusting unit in such a way that the pitch angle adjusting unit performs a rotational movement when the piston rod is moved in the longitudinal direction. The double-acting hydraulic cylinder is provided in a hydraulic chamber coupled by way of a first and a second hydraulic line so that the double-acting hydraulic cylinder is displaceable by feed of a hydraulic fluid through the first or second hydraulic line and thus leads to adjustment of the pitch angle of the turbine blades by way of the coupling to the piston rod and the pitch angle adjusting unit.

In an aspect of the present invention the turbine has a first and a second hydraulic line for the feed and discharge of hydraulic fluid. The first and second hydraulic lines are coupled in the piston rod to the first and second hydraulic lines of the shaft so that the hydraulic fluid can flow through the first and second hydraulic lines into the first and second hydraulic lines of the piston rod into the hydraulic chamber to displace the double-acting hydraulic cylinder.

In an aspect of the present invention the hydraulic chamber is divided by the double-acting hydraulic cylinder into a first and a second chamber. The first hydraulic line of the piston rod opens into the first chamber and the second hydraulic line opens into the second chamber.

One embodiment of the invention also concerns a hydroelectric power plant comprising a first portion whose inside diameter becomes smaller in the through-flow direction, a second portion adjoining the first portion for receiving the turbine, wherein the inside diameter of the second portion is at least partially of a spherical contour. The turbine has a plurality of turbine blades provided within the first portion in the region of the inside diameter with a spherical contour.

Another embodiment concerns the notion of providing a hydroelectric power plant having a first portion of an enlarged or increased diameter and a second portion, the turbine being provided in the second portion of the flow passage. Provided at least at the inside of the second portion of the flow passage in the region of the ends of the turbine blades is a recess which is at least portion-wise spherical or in the shape of a portion of a sphere so that the inside diameter of the second portion initially increases in the through-flow direction and then decreases again towards the end of the second portion. The inside diameter of the second portion is preferably adapted to a spherical contour.

The region of the second portion of the enlarged inside diameter is also adapted in particular to the adjustable turbine blades.

Another embodiment also concerns the notion of providing a turbine having hydraulically adjustable turbine blades for a hydroelectric power plant.

BRIEF DESCRIPTION OF THE SEVERAL VIEWS OF THE DRAWINGS

Advantages and embodiments by way of example of the invention are described in greater detail hereinafter with reference to the drawing.

DETAILED DESCRIPTION

Figure 1:
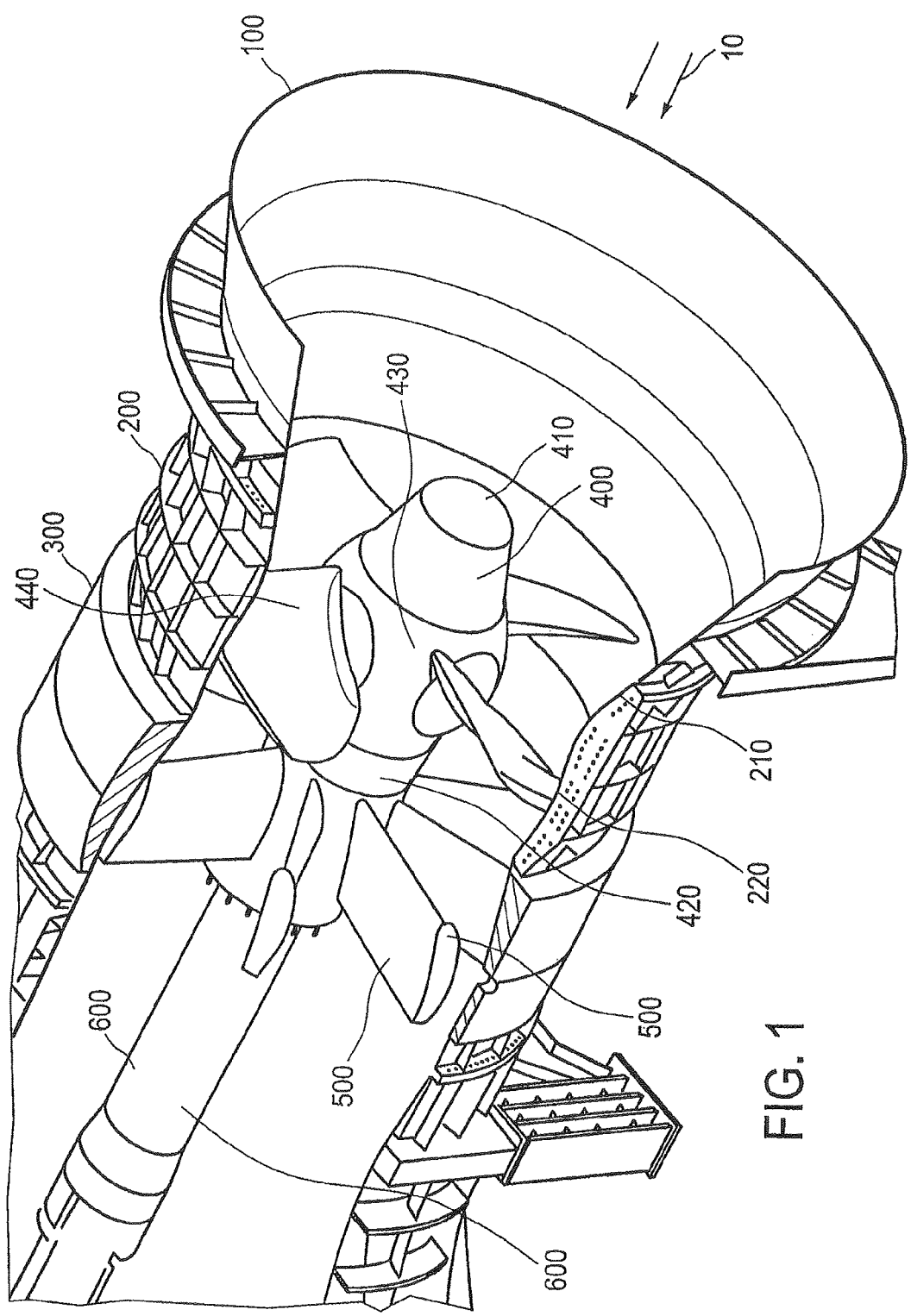
FIG. 1 shows a diagrammatic view in partial section through a hydroelectric power plant according to a first embodiment.

FIG. 1 shows a diagrammatic view in partial section of a hydroelectric power plant according to a first embodiment. The hydroelectric power plant of the first embodiment has a water flow passage having a first portion 100 whose inside diameter decreases or narrows in the through-flow direction, a second portion 200 whose inside diameter substantially follows a spherical contour and a third portion 300. Provided in the second portion 200 is a turbine 400 having a tip or nose 410, a hub 430 and a plurality of turbine blades 440. A guide apparatus 500 having a plurality of guide apparatus blades is provided in the region of the third portion 300. The water flows through the hydroelectric power plant in a through-flow direction 10, and firstly impinges on the turbine blades 440 and then on the guide apparatus 500.

In addition a shaft 600 is provided between the turbine 400 and a generator 900 (not shown in FIG. 1). The shaft 600 transmits the rotary movement produced by the turbine by virtue of rotation of the turbine blades to the generator which in turn converts the rotary movement into production or conversion of electric energy.

Figure 2:
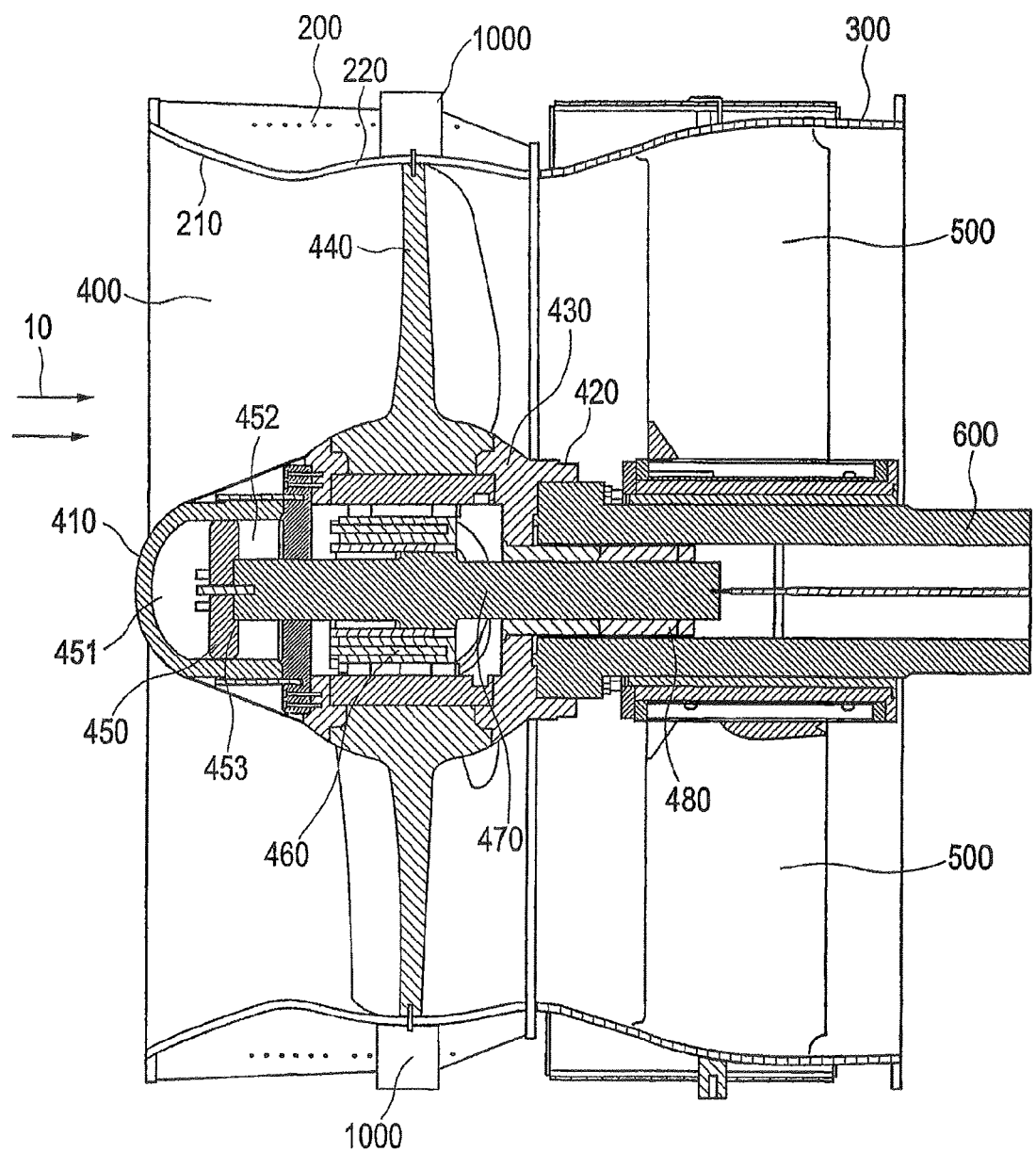
FIG. 2 shows a diagrammatic sectional view through a hydroelectric power plant according to a second embodiment, FIGS. 3 to 5 each show a diagrammatic sectional view of a turbine for a hydroelectric power plant according to a third embodiment.

FIG. 2 shows a diagrammatic sectional view through a hydroelectric power plant according to a second embodiment. The hydroelectric power plant of the second embodiment can be based on that in accordance with the first embodiment. The turbine 400 is provided substantially in the region of the second portion 200 (see FIG. 1) of the hydroelectric power plant. The turbine 400 has a tip 410 (a first end) and a second end 420 which is disposed downstream of the first end 410 in the through-flow direction 10. Provided between the first and second ends 410, 420 is a plurality of turbine blades 440 fixed rotatably to the hub 430. The pitch angle of the blades 440 can be adjusted in particular hydraulically by a pitch angle adjusting unit 460.

The pitch angle adjusting unit 460 has a double-acting hydraulic cylinder 450. The cylinder 450 has a piston 453 in a volume 451 and subdivides the volume 451 into a first and a second chamber 451, 452. The cylinder further has a piston rod 470 (with hydraulic lines) and a hydraulic transfer unit 480.

In accordance with the second embodiment pitch adjustment of the turbine blades 440 is effected by way of water hydraulics. The double-acting adjusting cylinder 450 is provided in the hub 410, 430 of the turbine 400. A hydraulic line 610, 620 in the rotating part is provided for example by longitudinal bores in the shaft 600. From the shaft 600 it goes into the hub 430 and by way of the hydraulic transfer unit 480 to longitudinal bores in the piston rod 470. Axial displacement of the piston rod 470 can be implemented by the hydraulic transfer unit 480, with simultaneous transfer of the hydraulic fluid.

An emergency shut-down unit 1000 can be provided in the region of the portion 220 and can cooperate with the turbine blades 440 if they involve an imbalance. In such a case the emergency shut-down unit 1000 is triggered and the turbine is stopped.

Figure 3:
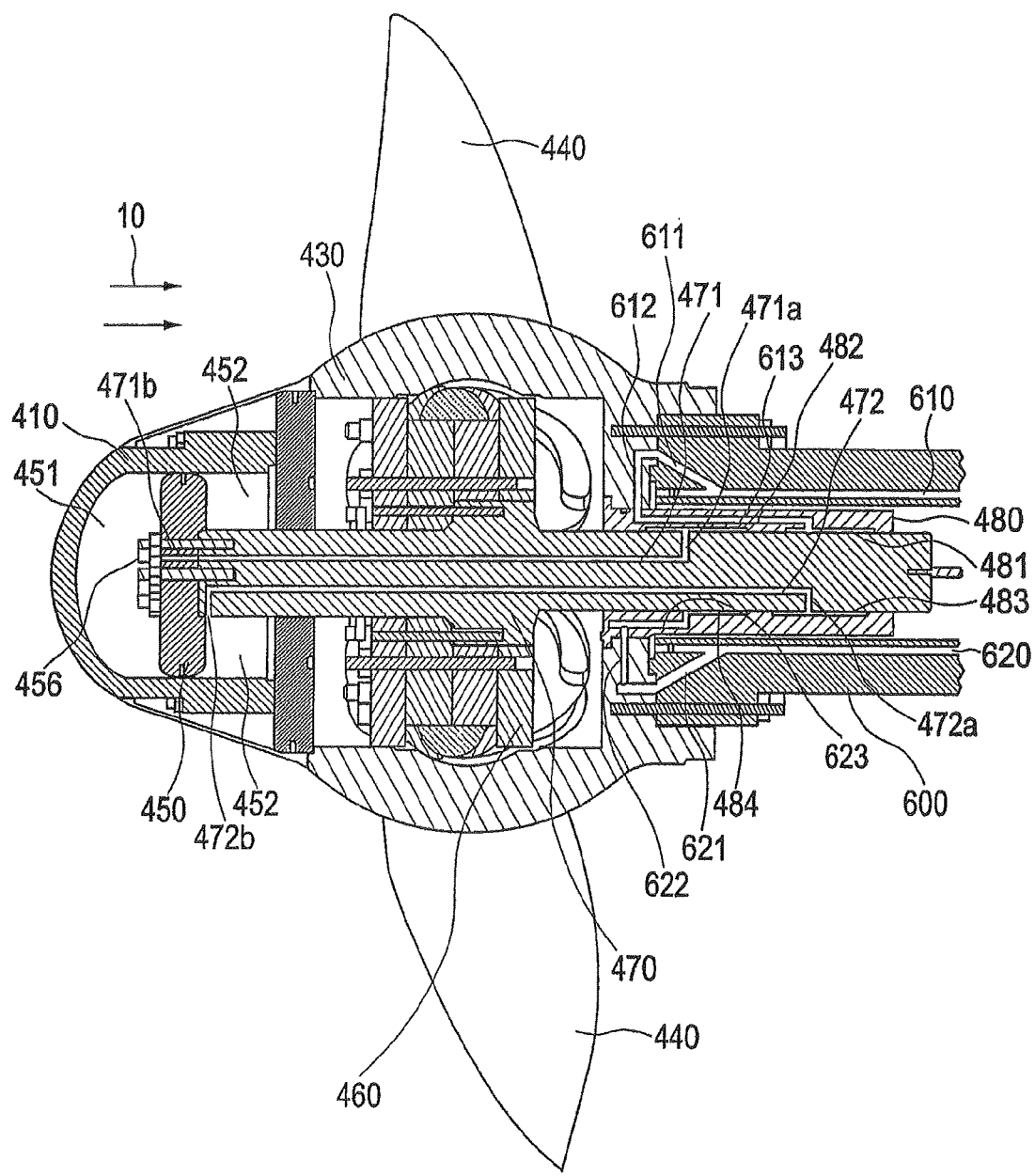

FIG. 3 shows a diagrammatic sectional view of a turbine for a hydroelectric power plant according to a third embodiment. The turbine has a turbine tip (first end) 410 and a rotatable hub 430 having a plurality of turbine blades 440. The turbine further has a double-acting hydraulic cylinder 450 in the region of the first end 410, a piston rod 470 with hydraulic lines 471, 472 and a hydraulic transfer unit 480.

A shaft 600 adjoins the turbine. A first hydraulic line 610 having a first, a second and a third portion 611, 612 and 613 as well as a second hydraulic line 620 having a first, a second and a third portion 621, 622, 623 are provided. The first portion 611 of the first hydraulic line 610 and the first portion 621 of the second hydraulic line 620 are provided in or at the shaft 600. The second portion 612 of the first hydraulic line 610 and the second portion 622 of the second hydraulic line 620 are provided in the hub 430. The third portion 613 of the first hydraulic line 610 and the third portion 623 of the second hydraulic line 620 are provided in or at the hydraulic transfer unit 480 or in the transfer cylinder.

The third portion 613 of the hydraulic line 610 opens into a first portion 481 of a hydraulic transfer unit 480. The third portion 623 of the second hydraulic line 620 opens into a second portion 484 of the hydraulic transfer unit 480.

Provided in the piston rod 470 are a first and a second hydraulic passage 471, 472. A first end 471*a* of the first hydraulic passage 471 opens into the region of the first portion 482 of the hydraulic transfer unit 480. The second end 471*b* of the hydraulic line 471 opens into a first portion 451 of a hydraulic chamber. The first portion 472*a* of the second hydraulic line 472 ends in the region of a third portion 483 of the hydraulic transfer unit 480. The second end 472*b* of the second hydraulic line 472 ends in a second chamber 452 which can be in the form of ring. The first portion 481 and the third portion 483 of the hydraulic transfer unit 480 can be in the form of a peripherally extending ring or passage. Thus there is a communication between the first and third portions 481, 483, which serves to allow the hydraulic fluid to flow from the third portion 613 into the second hydraulic passage 472 (or vice versa). The second portion 484 and the first portion 482 of the hydraulic transfer unit 480 can also form a ring or a peripherally extending passage so that the first and second portions 482, 484 can be in the form of a common portion. In that way hydraulic fluid can flow from the first hydraulic passage 471 to the third portion 623 of the second hydraulic line 620 (or vice versa).

A pitch angle adjusting unit 460 for pitch adjustment of the turbine blades 440 is coupled to the piston rod 470 so that the pitch angle adjusting unit 460 moves when the piston rod 470 moves.

Figure 4:
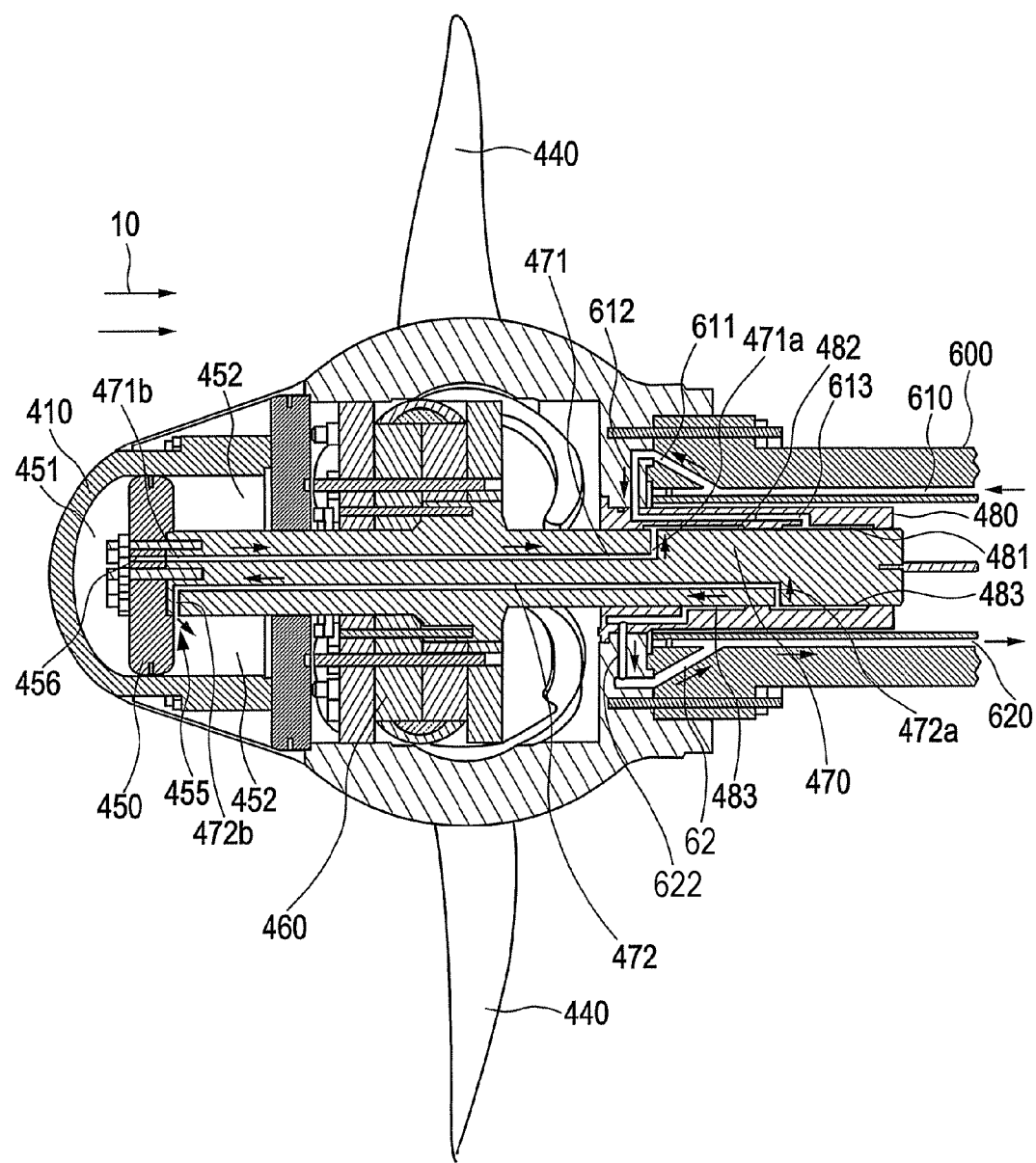

FIG. 4 shows a diagrammatic sectional view through the turbine according to the third embodiment. The structure of the turbine in FIG. 4 corresponds to the structure of the turbine in FIG. 3. In the case shown in FIG. 4 a hydraulic fluid (for example water) is urged into the first hydraulic line 610. The hydraulic fluid then flows through the first, second and third portions 611, 612, 613 of the first hydraulic line 610 into the fourth portion 481 of the hydraulic transfer unit 480. As the fourth and third portions 481, 483 of the hydraulic transfer unit 480 are in the form of a peripherally extending ring or passage the hydraulic fluid then flows through the ring or annular passage 481, 483 by way of the first end 472*a* of the hydraulic line 472 through the second hydraulic line 472 to the second end 472*b* of the hydraulic line 470 and from there into the hydraulic chamber 452. In that way the pressure in the second hydraulic chamber 452 is increased so that the double-acting hydraulic cylinder moves towards the left. The hydraulic fluid in the first hydraulic chamber 451 then flows from the second to the first end 471*b*, 471*a* of the second passage 471 and to the portion 482 of the hydraulic transfer unit 480, that is to say to the ring or annular passage 482, 483. From the first portion 482 the hydraulic fluid flows to the second portion 483 and from that portion it flows through the portions 623, 622 and 621 into the second hydraulic line 620.

When therefore hydraulic fluid is pushed into the first hydraulic line 610 the piston rod 472 (and therewith also the pitch angle adjusting unit 460) moves towards the left, that is to say in opposite relationship to the through-flow direction 10.

Figure 5:
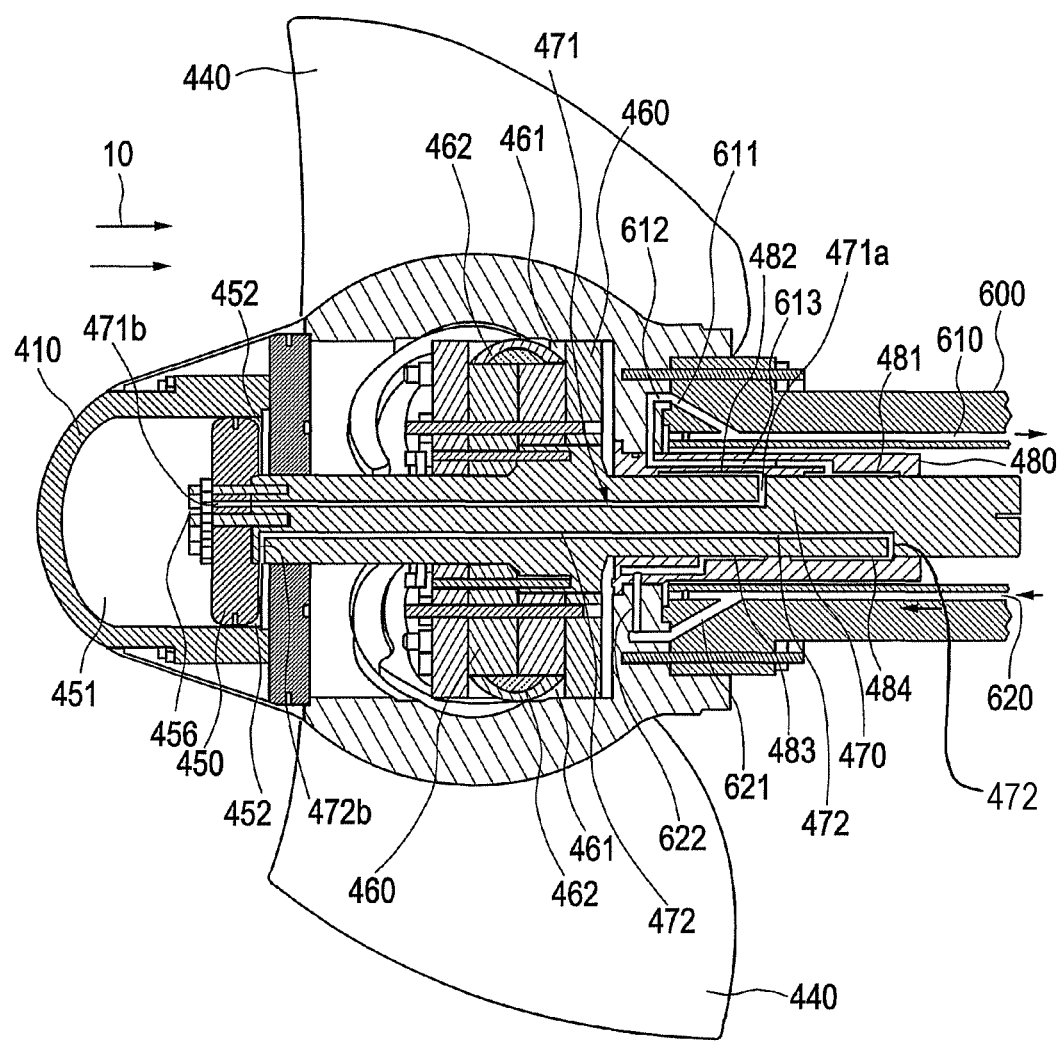

FIG. 5 shows a diagrammatic sectional view of the turbine of the fifth embodiment. The configuration of the turbine in FIG. 5 corresponds to the configuration of the turbine in FIG. 3 or FIG. 4. FIG. 5 shows the situation where hydraulic fluid is introduced through the second hydraulic line 620. The hydraulic fluid thus flows through the second hydraulic line 620 into the first, second and third portions 621, 622, 623. From there the hydraulic fluid flows through the portion 483 into the portion 482, that is to say through the ring or annular passage. From the portion 482 the hydraulic fluid flows into the first end 471*a* of the hydraulic line 471 into the piston rod 470. The hydraulic fluid then flows through the first hydraulic line 471 to the second end 471*b* and from there into the first hydraulic chamber 451 so that the piston rod 470 is moved towards the right, that is to say in the through-flow direction 10. Thus the hydraulic fluid flows out of the second chamber 452 through the second end 472*b* of the second hydraulic line 472 to the second end 472*a* of the second hydraulic line and from there into the portion 484 and further into the portion 481. In turn from the portion 481 the hydraulic fluid flows through the portions 613, 612 and 611 and then flows into the first hydraulic line 610.

The first hydraulic line 610 has a first portion 611 (in or at the shaft 600), a second portion 612 in the hub 430 and a third portion 613 in the hydraulic transfer unit 480.

According to one embodiment of the invention a linear translatory movement of the piston rod 470 is converted into a rotational movement of the turbine blades 440 for pitch adjustment. That is effected by the pitch angle adjusting unit 460. The pitch angle adjusting unit 460 is provided at the piston rod 470. The pitch angle adjusting unit 460 has grooves 461 provided at the ends thereof, that are towards the rotor blades. In addition for each turbine blade the pitch angle adjusting unit 460 has a slider 462 connected to the turbine blades at the region of the turbine blades, that is near the root. That slider 462 can be guided in or by the grooves 461. In that case the slider 462 follows a rectilinear movement of 90° in relation to the piston axis. The rotor blades 440 are fixed in the hub 430 by way of a radial bearing. The slider 462 is guided by the groove 461 in the pitch angle adjusting unit 460. The pitch angle adjusting unit 460 further has an adjusting disk 463 which has a bearing trunnion 464. The bearing trunnion 464 has a mounting for the slider 462 so that the slider can perform a rotational movement. The slider 462 can rotate about the trunnion 464 so that a linear translatory movement of the piston rod 460 is converted into a rotational movement of the turbine blades.

Thus the sliders 462 are mounted rotatably by way of a trunnion 464. The sliders 462 are guided in the groove 461 so that a linear movement of the piston rod is converted into a rotational movement.

Figure 6:
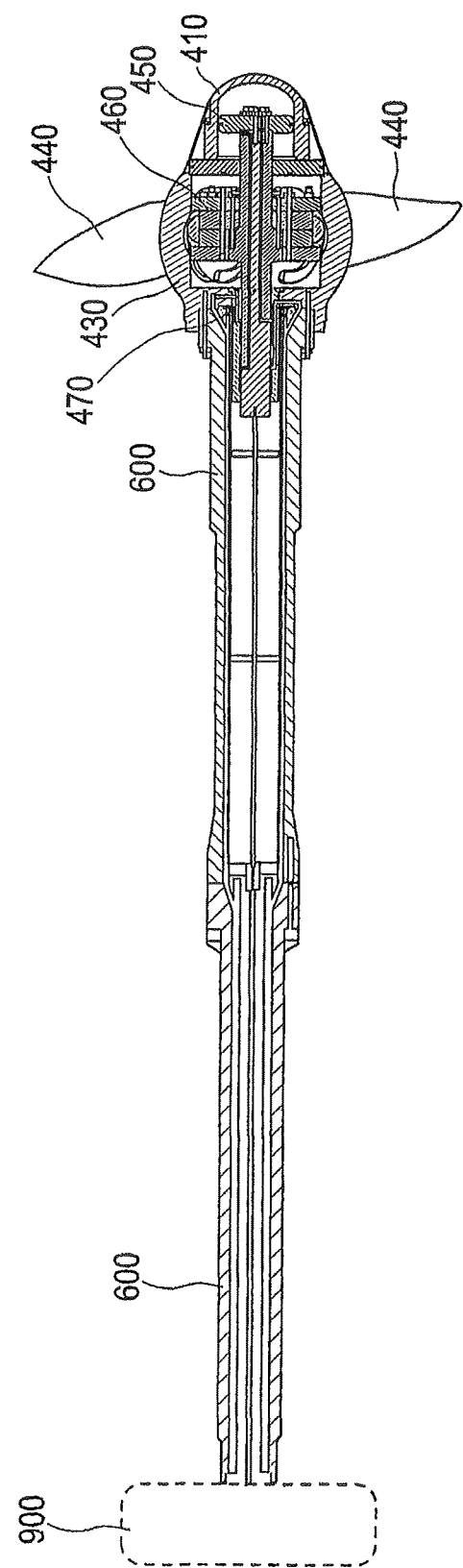
FIG. 6 shows a diagrammatic sectional view of a turbine and a shaft for a hydroelectric power plant according to a fourth embodiment, FIGS. 7A and 7B each show a perspective view of a generator cradle for a generator of a hydroelectric power plant according to a fifth embodiment.

FIG. 6 shows a diagrammatic sectional view through a turbine with an associated shaft for a hydroelectric power plant according to a fourth embodiment. In this case the turbine can correspond to the turbine shown in FIGS. 3 to 5. The hub 430 of the turbine 400 is coupled to the shaft 600 which in turn can be coupled to a generator 900.

Figure 7A:
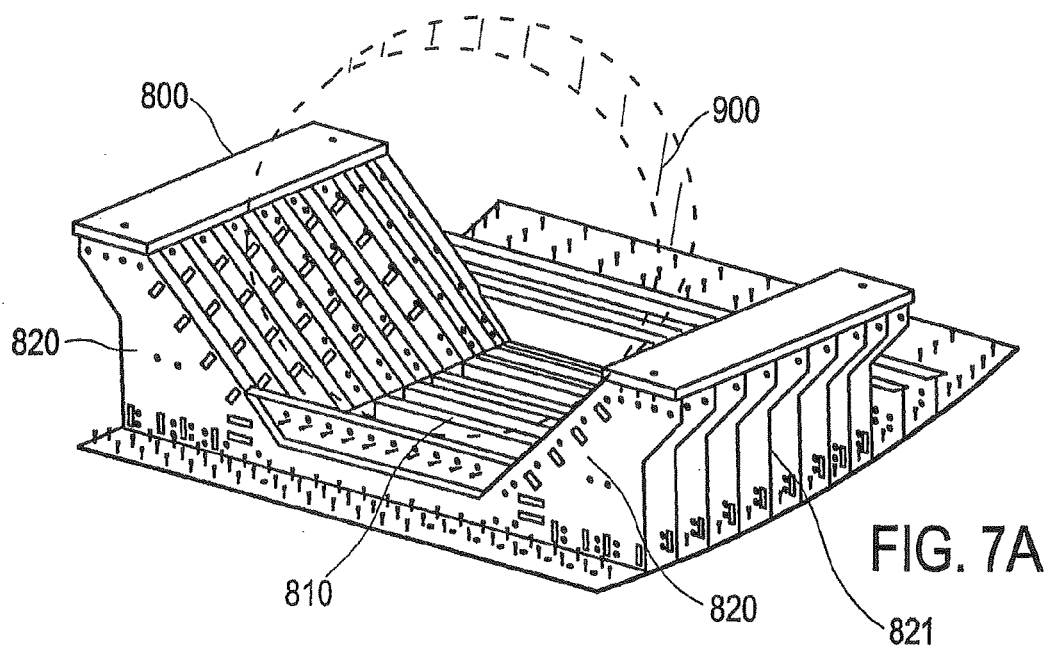
Figure 7B:
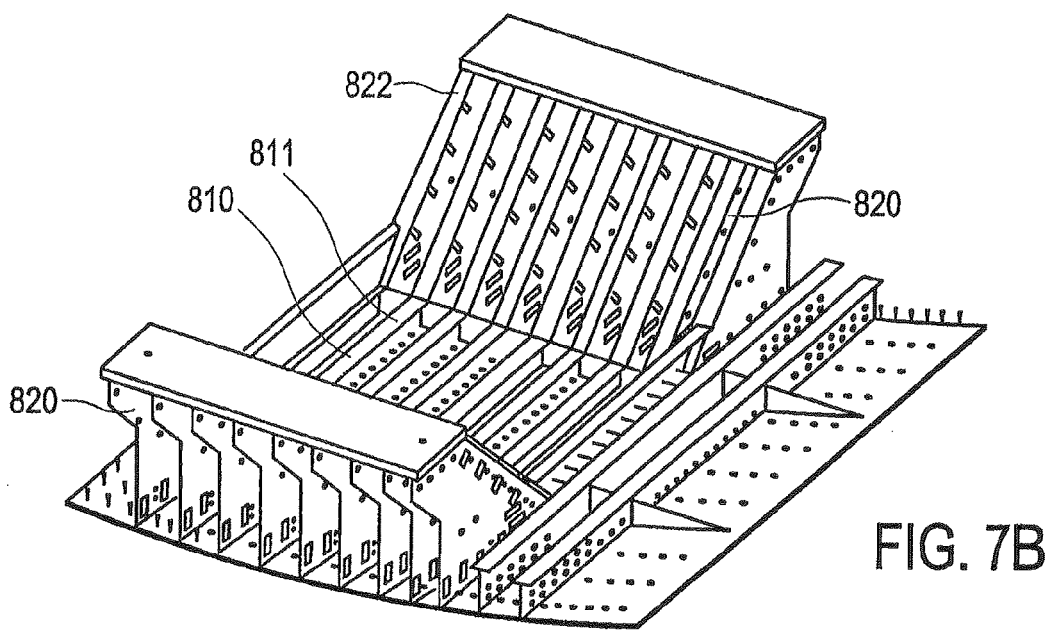

FIGS. 7A and 7B each show a perspective view of a generator cradle for receiving an electric generator for a hydroelectric power plant. In particular the placement of the generator cradle on an S-pipe contour is shown. The generator cradle 800 has a bottom 810 and two side arms 820. In this case the side arms 820 are at such an angle relative to the bottom 810 that an electric generator 900 can be placed therein and can be held by the arms 820 and the bottom 810. At their outside the arms have a plurality of plates 821. A plurality of legs 822 are provided on their inside. The bottom 810 also has a plurality of legs 811 which can be oriented with the legs 822.

The generator cradle can be coated with concrete with thin wall thicknesses and in that case can nonetheless be water-tightly closed off. The cradle can serve as a protection for the generator.

Figure 8:
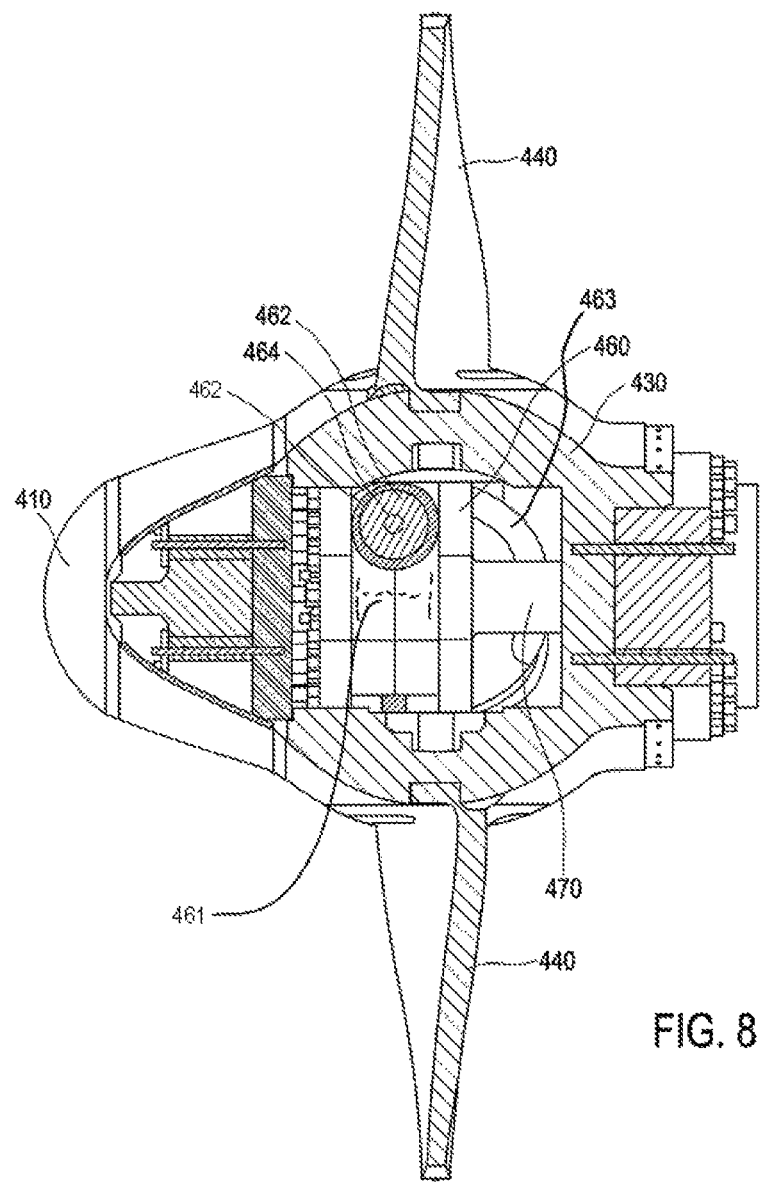
FIG. 8 shows a diagrammatic sectional view through a turbine for a hydroelectric power plant according to a sixth embodiment.

FIG. 8 shows a diagrammatic sectional view through a turbine for a hydroelectric power plant according to a sixth embodiment. The structure of the turbine of the sixth embodiment can correspond to the structure of the turbine according to the third embodiment or can be based thereon. The turbine has a tip or nose 410, a hub 430 and a plurality of turbine blades 440. The pitch angle of the rotor blades 440 can be adjusted by means of the pitch angle adjusting unit 460. The pitch angle adjusting unit 460 is coupled to the piston rod 470 so that a movement of the piston rod 470 also leads to a movement of the pitch angle adjusting unit 460. The pitch angle adjusting unit 460 has grooves 461 provided at the ends thereof, that are towards the rotor blades 440. For each turbine blade 440 the pitch angle adjusting unit 460 also has a slider 442 connected to the turbine blades 440 at the region of the turbine blades 440, that is near the root. The slider 462 can be guided in or by the groove 461. A movement of the piston rod 470 leads to a linear translatory movement of the pitch angle adjusting unit so that the sliders 462 are also moved in the grooves 461. An adjusting disk 463 is provided at the end of the turbine blades, that is near the root. In particular the adjusting disk 463 is connected by way of a bearing trunnion 464 so that the adjusting disk 463 can move together with the slider 462.

Figure 9:
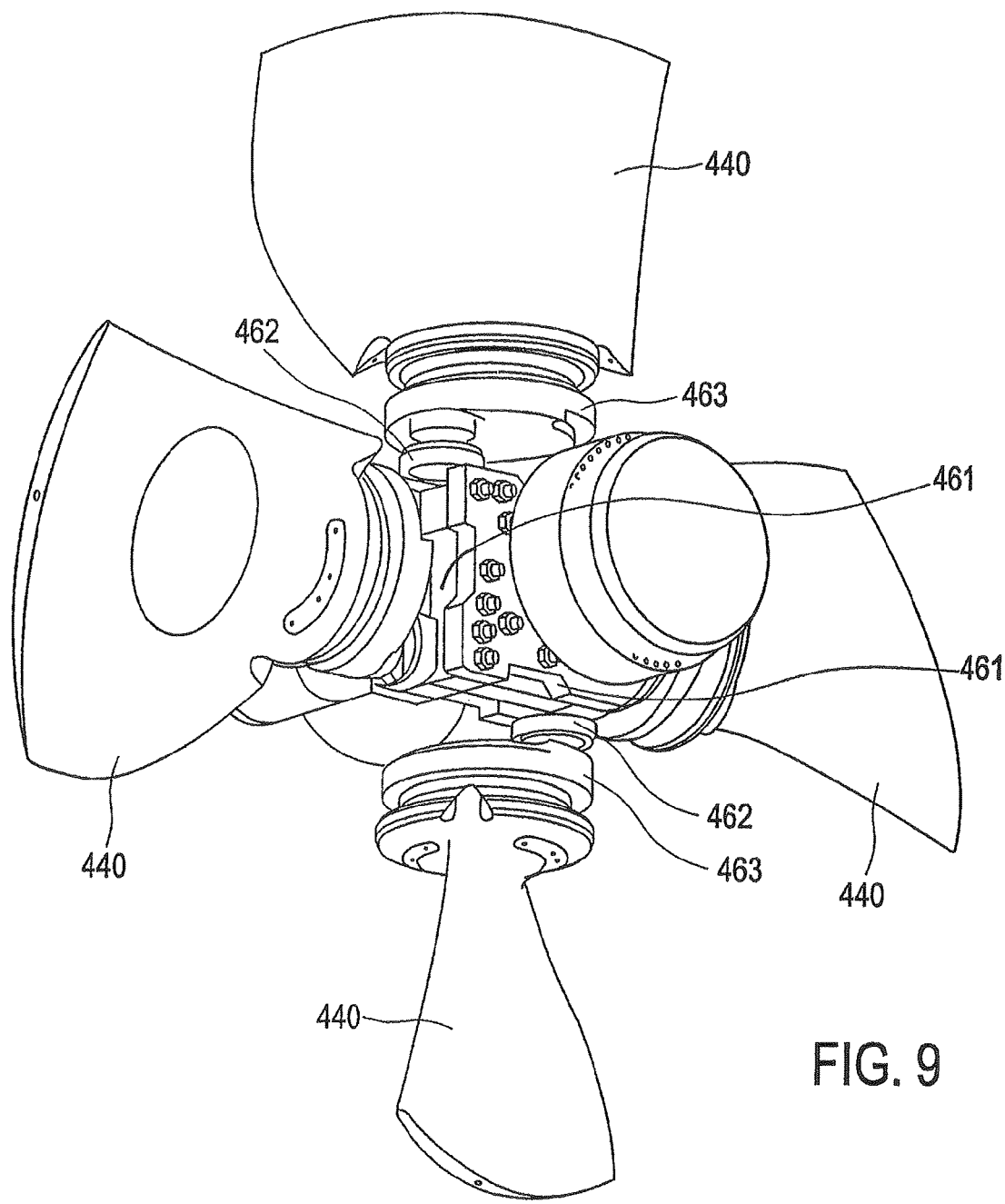
FIG. 9 shows a diagrammatic view of a part of a turbine for a hydroelectric power plant according to the sixth embodiment.

FIG. 9 shows a diagrammatic view of a part of a turbine for a hydroelectric power plant according to the sixth embodiment. FIG. 9 does not show some components of the turbine for the hydroelectric power plant in order to be able to better show the adjusting disk 463, the slider 462 and the grooves 461. The adjusting disk 463 is fixed to the rotor blades 440. The slider 462 can be provided at the adjusting disk 463, which slider 462 can in turn engage into the grooves 461 on the pitch angle adjusting unit 460. A movement of the pitch angle adjusting unit 460 provides that the sliders 462 which are disposed in the grooves 461 also move therewith and thus cause adjustment of the pitch angle of the turbine blades 440.

Figure 10:
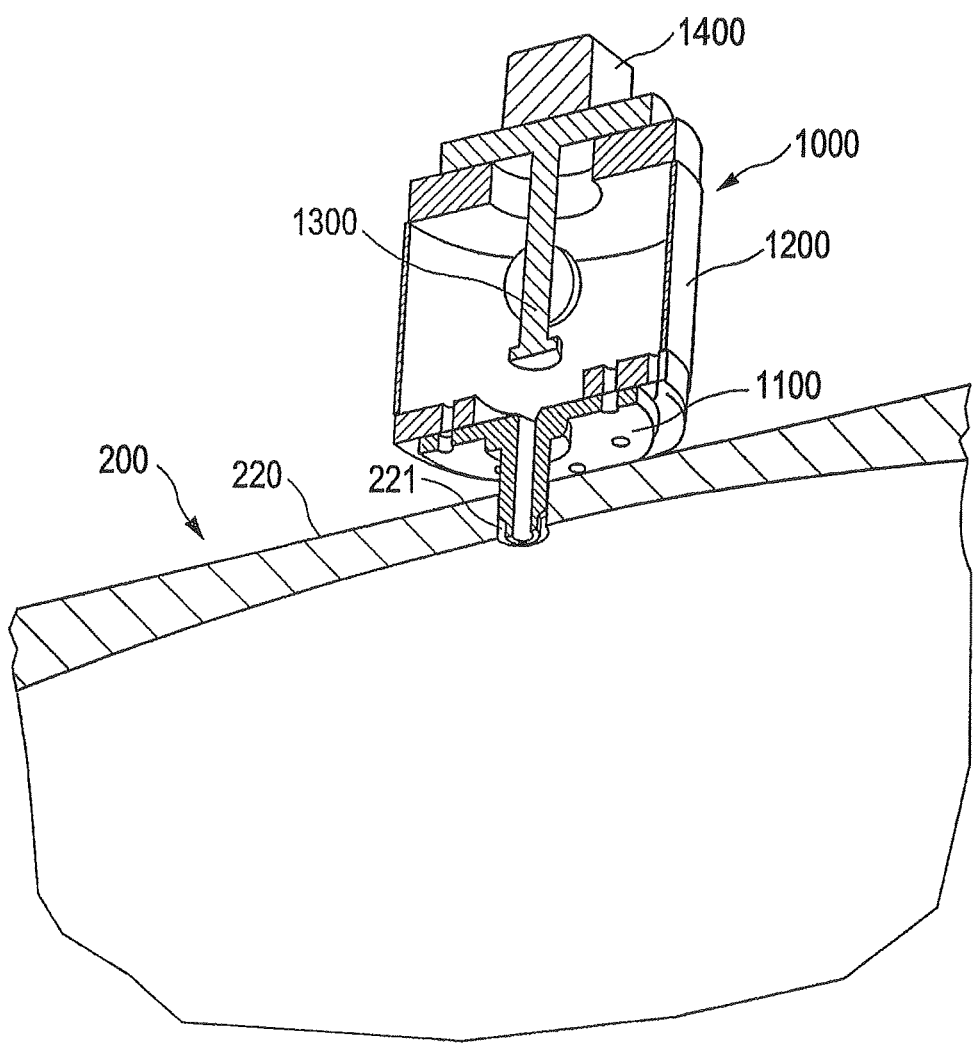
FIG. 10 shows a portion of a turbine for a hydroelectric power plant according to a seventh embodiment.

FIG. 10 shows a portion of a turbine for a hydroelectric power plant according to a seventh embodiment. An emergency shut-down unit 1000 can be provided in the region of the second portion 200. In this case the emergency shut-down unit 1000 projects with its first end 1100 at least partially into the portion through which water flows. If the turbine blades 440 are no longer running true then they can come into contact with the first end 1100 of the shut-down unit 1000. In such a case for example water can flow through the first end 1100 into the interior of a second portion 1200. Provided in the second portion is a float 1300 which, when water passes into the second portion through the first end 1100, floats upwardly so that the second end 1400 can trigger a contact.

Figure 11:
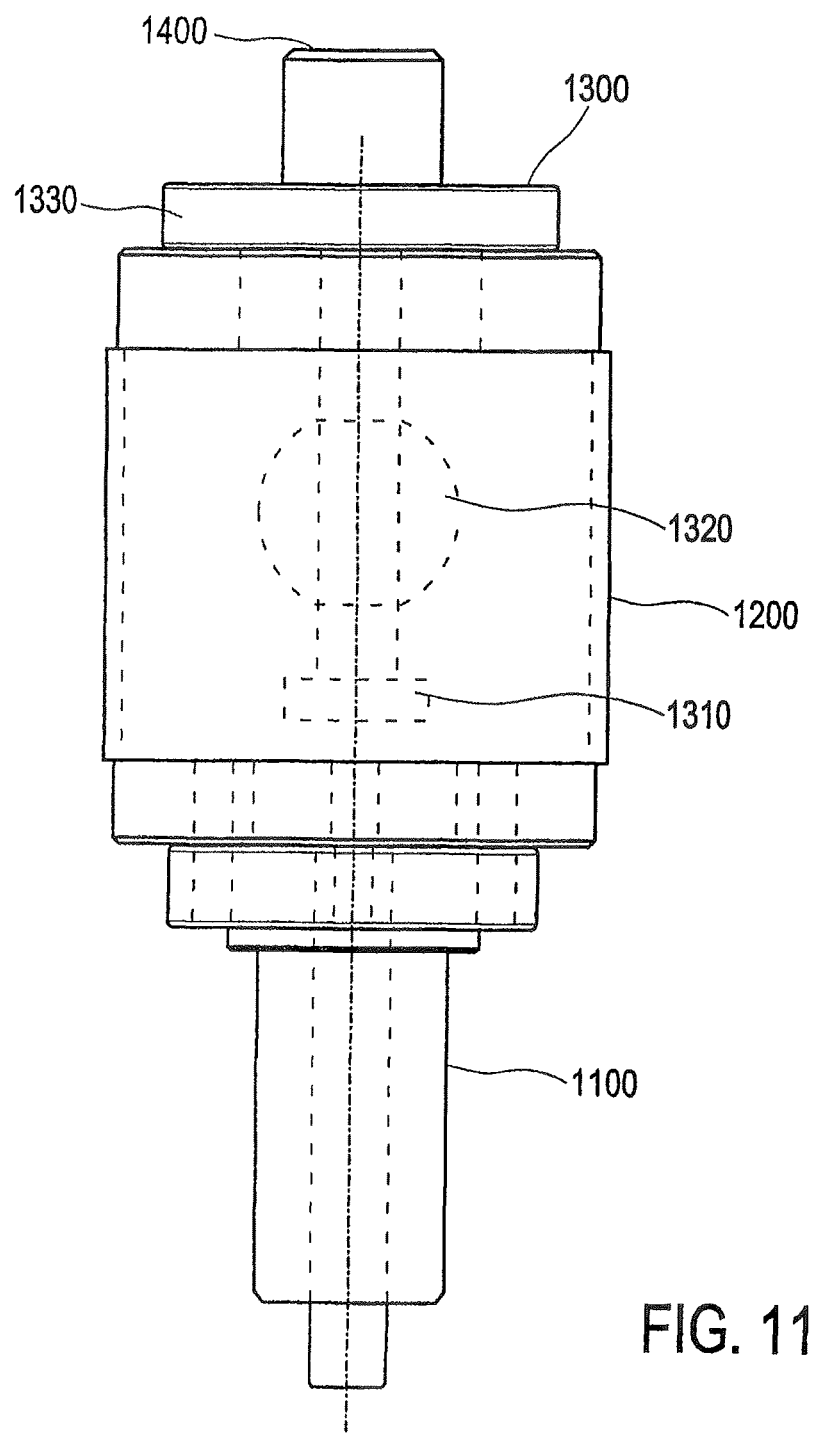
FIG. 11 shows a diagrammatic view of a safety shut-down switch for a turbine for a hydroelectric power plant according to the seventh embodiment.

FIG. 11 shows a diagrammatic view of a safety shut-down switch for a turbine for a hydroelectric power plant according to the seventh embodiment. The emergency shut-down unit 1000 has a first end 1100 and a second end 1400. Provided therebetween are a central portion 1200 and a float 1300. In the event of an imbalance of the turbine blades 440 a part of the first end 1100 can be knocked off so that water can penetrate into the interior of the shut-down unit. Provided in the central portion 1200 is a float 1300 having a first end 1310 and a second end 1330. A float unit 1320 can be provided therebetween. If water flows into the interior of the central portion 1200 then the float 1300 will float on the surface of the water. When the central portion 1200 is full then the float 1300 floats upwardly so that the second end 1400 can trigger a contact.

The various embodiments described above can be combined to provide further embodiments. All of the U.S. patents, U.S. patent application publications, U.S. patent application, foreign patents, foreign patent application and non-patent publications referred to in this specification and/ or listed in the Application Data Sheet are incorporated herein by reference, in their entirety. Aspects of the embodiments can be modified, if necessary to employ concepts of the various patents, application and publications to provide yet further embodiments.

These and other changes can be made to the embodiments in light of the above-detailed description. In general, in the following claims, the terms used should not be construed to limit the claims to the specific embodiments disclosed in the specification and the claims, but should be construed to include all possible embodiments along with the full scope of equivalents to which such claims are entitled. Accordingly, the claims are not limited by the disclosure.

The invention claimed is:

1. A turbine for a hydroelectric power plant comprising:
a hub;
a plurality of turbine blades coupled to the hub;
a pitch angle adjusting unit coupled to the turbine blades for adjusting the pitch angle of the turbine blades;
a double-acting hydraulic cylinder;
a piston rod coupled to the pitch angle adjusting unit so that the pitch angle adjusting unit performs a rotational movement when the piston rod is moved in a longitudinal direction, the piston rod including first and second hydraulic lines; and
a hydraulic chamber coupled by way of the first and second hydraulic lines so that the double-acting hydraulic cylinder is displaceable by providing hydraulic fluid through the first or second hydraulic lines and to cause adjustments to the pitch angle of the turbine blades due to coupling between the piston rod and the pitch angle adjusting unit,
wherein the turbine is located in the hydroelectric power plant including:
a first portion having a tapered inside diameter;
a second portion in fluid communication with the first portion, the second portion including the turbine, the plurality of turbine blades located within the second portion; and
an emergency shut-down unit on the second portion, wherein the emergency shut-down unit has a first end that extends at least partially through an inside diameter of the second portion and through which water flows when the turbine blades are imbalanced and come into contact with the first end of the emergency shut-down unit, thereby actuating the emergency shut-down unit.

2. The turbine as set forth in claim 1 further comprising:
a third and a fourth hydraulic line for feeding and discharging hydraulic fluid to the turbine, wherein the first and second hydraulic lines in the piston rod are coupled to the third and fourth hydraulic lines so that hydraulic fluid can flow through the third and fourth hydraulic lines into the first and second hydraulic lines of the piston rod into the hydraulic chamber to displace the double-acting hydraulic cylinder.

3. The turbine as set forth in claim 1 wherein:
the hydraulic chamber is divided by the double-acting hydraulic cylinder into a first chamber and a second chamber;
wherein the first hydraulic line of the piston rod opens into the first chamber and the second hydraulic line opens into the second chamber.

4. A hydroelectric power plant comprising:
a first portion having a tapered inside diameter such that the diameter becomes smaller in a through-flow direction;
a second portion in fluid communication with the first portion, the second portion including a turbine, wherein a region of an inside diameter of the second portion is of a spherical contour,
wherein the turbine has a plurality of turbine blades located within the second portion in the region of the inside diameter with a spherical contour, and
an emergency shut-down unit on the second portion, wherein the emergency shut-down unit has a first end that extends at least partially through the inside diameter of the second portion and through which water flows when the turbine blades are imbalanced and come into contact with the first end of the emergency shut-down unit, thereby actuating the emergency shut-down unit.

5. The hydroelectric power plant as set forth in claim 4, wherein the turbine comprises:
a pitch angle adjusting unit coupled to the plurality of turbine blades for adjusting the pitch angle of the turbine blades;
a double-acting hydraulic cylinder; and
a piston rod coupled to the pitch angle adjusting unit so that the pitch angle adjusting unit performs a rotational movement when the piston rod is moved in a longitudinal direction, the piston rod including first and second hydraulic lines.

6. The hydroelectric power plant as set forth in claim 4, wherein the turbine further includes a hydraulic chamber coupled by way of first and second hydraulic lines so that a double-acting hydraulic cylinder is displaceable by providing hydraulic fluid through the first or second hydraulic lines and to cause adjustments to the pitch angle of the turbine blades due to coupling between the piston rod and the pitch angle adjusting unit.

* * * * *